United States Patent [19]
Hongu et al.

[11] 4,261,016
[45] Apr. 7, 1981

[54] TELEVISION RECEIVER

[75] Inventors: Masayuki Hongu, Kawasaki; Masaharu Tokuhara, Tokyo, both of Japan

[73] Assignee: Sony Corporation, Tokyo, Japan

[21] Appl. No.: 38,944

[22] Filed: May 14, 1979

[30] Foreign Application Priority Data

May 18, 1978 [JP] Japan .................................. 53-59179

[51] Int. Cl.$^3$ ............................................. H04N 5/50
[52] U.S. Cl. ............................. 358/195.1; 358/191.1
[58] Field of Search ............... 455/182, 192, 150, 170; 358/188, 191.1

[56] References Cited

U.S. PATENT DOCUMENTS

| 3,697,685 | 10/1972 | Lunn | 358/188 |
| 3,750,029 | 7/1973 | Baars | 358/188 |
| 3,980,951 | 9/1976 | Breeze | 455/182 |
| 4,053,933 | 10/1977 | Collins | 455/182 |
| 4,077,008 | 2/1978 | Rast | 455/180 |
| 4,110,693 | 8/1978 | Evans | 455/180 |
| 4,121,162 | 10/1978 | Alberkrack | 455/182 |
| 4,128,849 | 12/1978 | Rhee | 455/182 |
| 4,142,158 | 2/1979 | Belisomi | 455/183 |

Primary Examiner—Robert L. Griffin
Assistant Examiner—Michael A. Masinick
Attorney, Agent, or Firm—Lewis H. Eslinger; Alvin Sinderbrand

[57] ABSTRACT

An automatic fine tuning loop in a television receiver is controlled by phase comparison between a video intermediate frequency signal and a reference oscillator signal. The reference oscillator signal is used in synchronous detection of the video intermediate frequency signal. The frequency of the reference oscillator is controlled by a phase locked loop, of which it is a part, and which includes a low-pass filter having selectable high and low cut-off frequencies. A lock-out detector selects the high cut-off frequency for rapid correction when lock-out is detected and selects the low cut-off frequency for frequency stability when lock-in is detected. An AFT disable switch disables the automatic fine tuning loop during manual tuning. In one embodiment, a disable switch ganged with the AFT disable switch selects the high cut-off frequency in the low-pass filter to prevent hunting.

8 Claims, 11 Drawing Figures

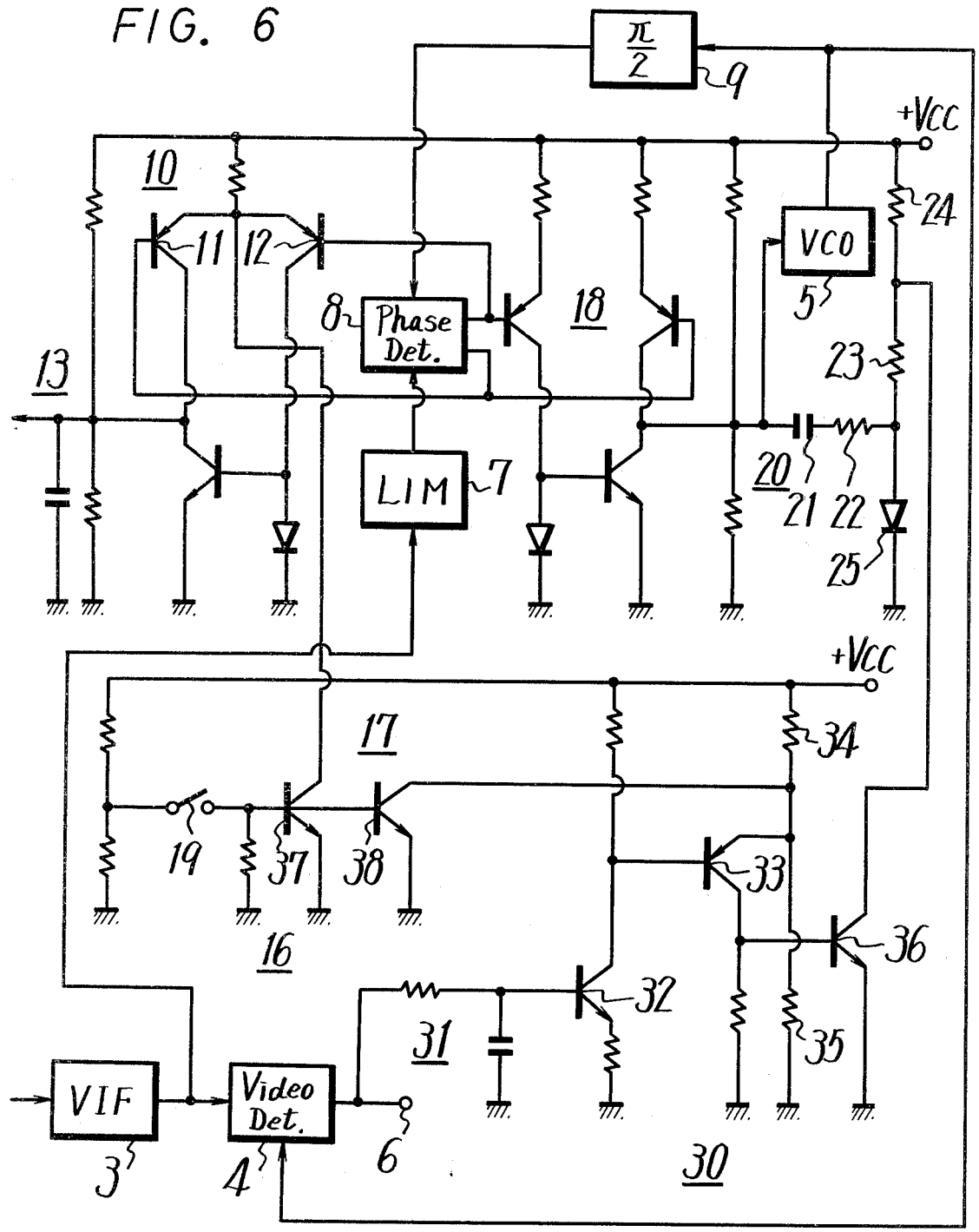

TELEVISION RECEIVER

BACKGROUND OF THE INVENTION

1. Field of the Invention

The present invention relates generally to a television receiver using a synchronous detector, and is directed more particularly to a television receiver which employs a common reference oscillator to carry out both automatic fine tuning (AFT) and synchronous detection.

2. Description of the Prior Art

U.S. Pat. No. 3,750,029 discloses a television receiver which uses a single reference oscillator to accomplish both automatic fine tuning (AFT) and synchronous detection of a video signal. A phase detector in a phase locked loop (PLL) compares the phases of the reference oscillator signal and a video intermediate frequency signal to generate a control signal which, when applied to the reference oscillator, achieves coincidence between the frequencies and/or phases of the two signals. In the identified patent, the output of the phase detector applied to the reference oscillator includes relatively high frequency components to provide a short lock-in time of the PLL. However, this permits the frequency of the reference oscillator to be varied faster than is desirable for good detection by the synchronous detector.

OBJECTS AND SUMMARY OF THE INVENTION

Accordingly, it is an object of the present invention to provide a television receiver using a single reference oscillator in which the lock-in time of a PLL circuit can be made short without degrading the purity of a reference signal.

Another object of the invention is to provide a television receiver using a reference oscillator which prevents abnormal operation of a PLL circuit during manual fine tuning.

According to an aspect of the invention, a television receiver is provided for receiving a television signal and for producing at least a video signal therefrom comprising means including a local oscillator for automatically fine tuning the television signal and for producing therefrom a video intermediate frequency signal, means including a reference oscillator for producing a reference frequency signal, a low-pass filter having first and second different selectable time constants, detection means responsive to the video intermediate frequency signal and the reference frequency signal for detecting the video signal, means responsive to an output of the detection means for selecting one of the first and second selectable time constants, and means for preventing operation of the first mentioned means.

According to a feature of the invention, there is provided other means ganged for operation with the last previously mentioned means for preventing production of the reference frequency signal and for selecting the longer of the first and second selectable time constants.

The other objects, features and advantages of the present invention will become apparent from the following description taken in conjunction with the accompanying drawings through which the like references designate the same elements.

BRIEF DESCRIPTION OF THE DRAWINGS

FIG. 6 is a block and schematic diagram showing detail of portions of the circuit of FIG. 2.

DESCRIPTION OF THE PREFERRED EMBODIMENTS

Figure 1:
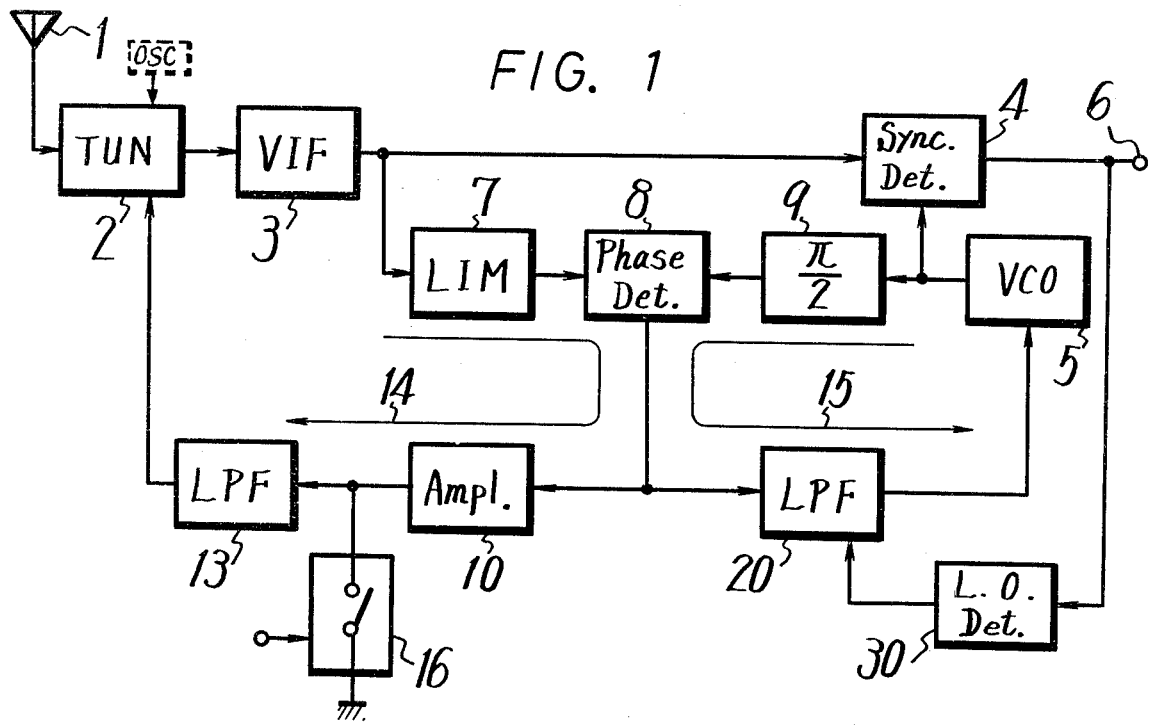
FIG. 1 is a block diagram of a portion of a television receiver according to an embodiment of the present invention.

Referring now to FIG. 1, a radio frequency (RF) signal, received by an antenna 1, is fed to a tuner 2 to be converted into a video intermediate frequency (VIF) signal. The VIF signal is fed to a VIF amplifier 3 where it is amplified and fed to a synchronous video detector 4. The amplified VIF signal is synchronously detected in synchronous video detector 4 using a reference signal from a reference oscillator 5. The detected output of synchronous video detector 4 is applied to an output terminal 6. The VIF signal from VIF amplifier 3 is also fed through a limiter 7 to a phase detector 8 where it is phase-detected with a reference signal derived from reference oscillator 5 and phase shifted 90° ($\pi/2$) in a phase shifter 9. The phase-detected signal from phase detector 8 is applied through a DC amplifier 10 and a low pass filter 13 to a local oscillator in tuner 2 to control the oscillating frequency in a manner well known in the art. Thus, tuner 2, VIF amplifier 3, limiter 7, phase detector 8, DC amplifier 10 and low pass filter 13 form an AFT loop 14 which maintains the frequency of the local oscillator in tuner 2 at a value which agrees with the frequency of reference oscillator 5. An AFT defeat switch 16 permits tuning AFT loop 14 OFF when desired such as, for example, during manual tuning of tuner 2. When AFT defeat switch 16 is OFF, AFT loop 14 is ON, and when the AFT defeat switch 16 is ON, AFT loop 14 is OFF.

Reference oscillator 5 is suitably a voltage controlled oscillator (VCO) whose frequency is controlled by a control voltage applied thereto from phase detector 8 through a low pass filter 20. Reference oscillator 5, phase shifter 9, phase detector 8, amplifier 18 and low pass filter 20 form a PLL circuit 15. Low pass filter 20 has two selectable time constants.

Figure 3A:
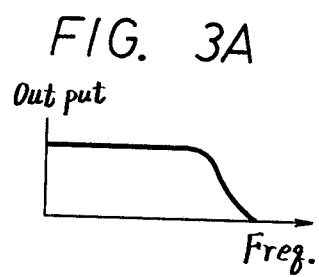
FIGS. 3A to 3D, 4A, 4B, 5A and 5B are waveform diagrams to which reference will be made in explaining the operation of the apparatus shown in FIGS. 1 and 2.

The output signal from synchronous video detector 4 is applied to a lock-out detector 30 which detects whether synchronous detection is in a lock-out state or a lock-in state. The output signal from lock-out detector 30 selects the time constant of low pass filter 20. In the lock-out state, the time constant of low pass filter 20 is relatively short and its cut-off frequency is relatively high as shown in FIG. 3A. In the lock-in state, the time constant of low pass filter 20 is relatively long and its cut-off frequency is relatively low as shown in FIG. 3B.

Figure 3C:
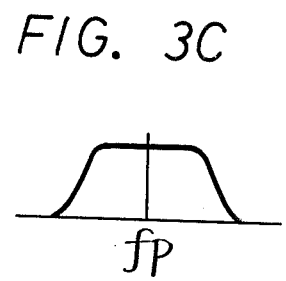
Figure 3B:
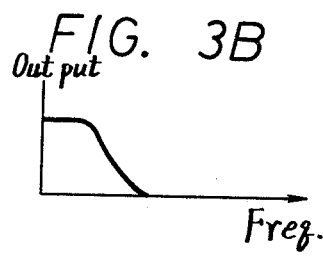
Figure 3D:
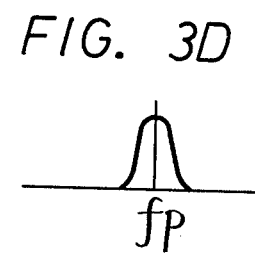

When AFT defeat switch 16 is OFF to turn AFT loop 14 ON, if synchronous detector 4 should be in its lock-out state, the cut-off frequency of low pass filter 20 is high and hence the signal applied to reference oscillator 5 may have wide band signal components centered on video intermediate carrier frequency $f_p$ (FIG. 3C). Thus, the capture range for capture of PLL circuit 15 is wide and hence synchronous detector 4 quickly achieves lock-in. When lock-in is attained, the cut-off frequency of low pass filter 20 is changed from high to low. As a result, the reference voltage applied to reference oscillator 5 contains signal components having a narrow bandwidth centered on the video intermediate carrier frequency $f_p$ (FIG. 3D). The narrow bandwidth of the reference voltage improves the purity of the reference signal and prevents the generation of cross color beats between the video carrier and the color sub-carrier thereby improving the quality of the detected video output signal.

However, in a television receiver containing an embodiment of the invention described as above, when AFT defeat switch 16 is turned ON to turn the AFT loop 14 OFF, undesired phenomena may occur during manual fine tuning. When the oscillating frequency of the local oscillator in tuner 2 is manually tuned to a frequency which converts the video intermediate carrier frequency of a received signal to a frequency having a difference from the video intermediate carrier frequency $f_p$ in the vicinity of a critical value, the lock-out detector 30 may perform hunting. During hunting, the time constant of low pass filter 20 is frequently changed between its two values and the lock-in and lock-out states are thus alternately repeated. Hunting occurs when a receiver carrier frequency is converted by manual tuning to an intermediate frequency falling between the bandwidth extremities of the wide and narrow bandwidths of low pass filter 20. During lock-out, the time constant of low pass filter 20 is short and its capture range is wide. If manual tuning converts a received carrier frequency to an intermediate frequency just inside the lock-in range using the short time constant of low pass filter 20, lock-in is achieved and the time constant is changed from short to long. This narrows the capture range of PLL circuit 15 and may narrow it enough to lose lock and thus again enter the lock-out state. In the lock-out state, the time constant of the low pass filter 20 becomes short which again permits capture of PLL circuit 15 and reentry into lock-in. Due to hunting, the signal at output terminal 6 oscillates between normal detecting and a beat output. When reproduced on the picture screen (not shown) of the television receiver a peculiar oscillating phenomenon is displayed.

Figure 2:
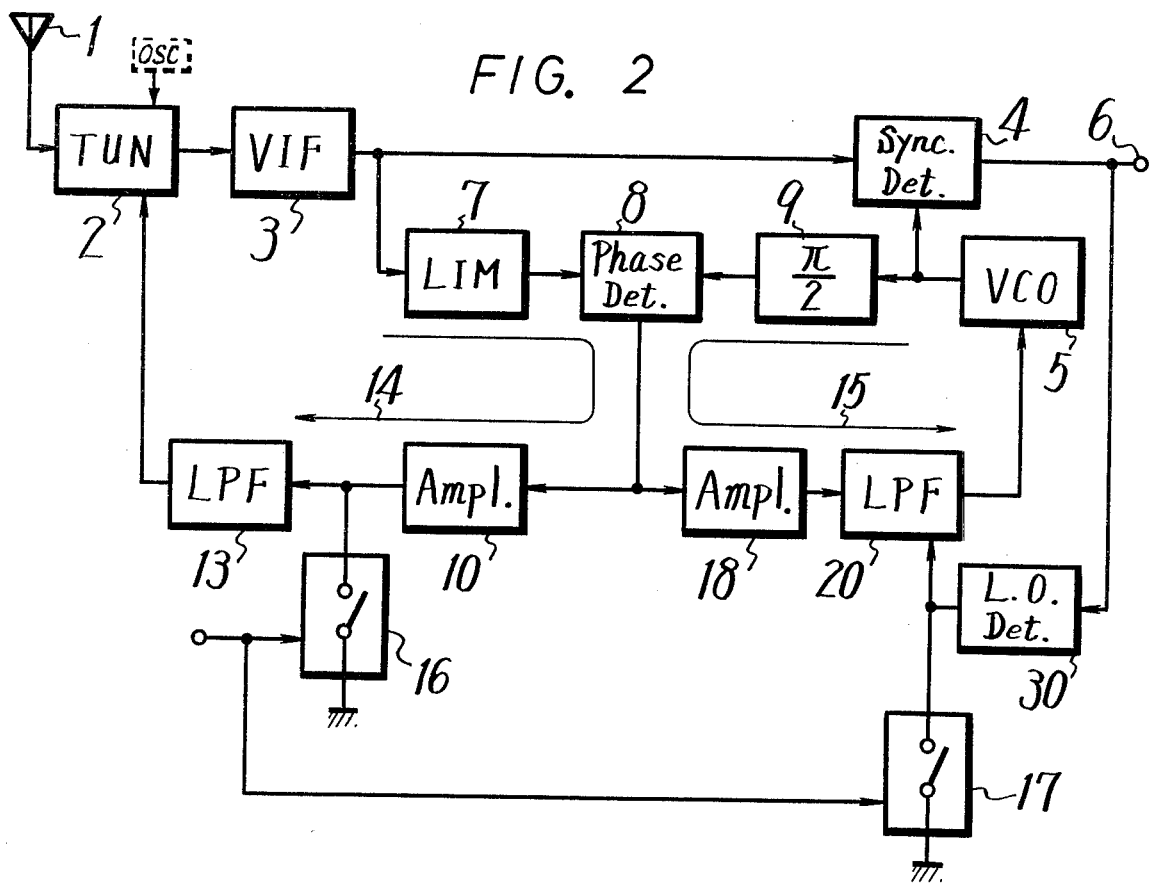
FIG. 2 is a block diagram of a portion of a television receiver according to another embodiment of the invention.

The embodiment of FIG. 2 overcomes the hunting phenomenon during manual tuning encountered in the embodiment of FIG. 1. In FIG. 2 the same reference numerals as those used in FIG. 1 designate the same elements and their detailed description thereof will be omitted for the sake of brevity.

A DC amplifier 18 is provided between phase detector 8 and low pass filter 20, and an additional defeat switch 17 is provided from the output of lock-out detector 30 to ground. Defeat switch 17 is in ganged with the AFT defeat switch 16. When AFT defeat switch 16 is OFF, placing AFT loop 14 ON, defeat switch 17 is also OFF and the detected output signal from lock-out detector 30 is fed to low pass filter 20 to change its time constant as set forth above. However, when AFT defeat switch 16 and defeat switch 17 are in their ON, or closed positions, AFT loop 14 is OFF, defeat switch 17 grounds the signal from lock-out detector 30 and prevents its application to low pass filter 20. The time constant of low pass filter 20 is fixed at its greater value and the bandwidth of low pass filter 20 is fixed at its smaller value. Since the bandwidth of low pass filter 20 cannot be changed by signals from lock-out detector 30, hunting does not occur. Manual fine tuning in this condition produces lock-in only when the VIF signal is accurately tuned within the narrow range of FIG. 4B. Accordingly, when the AFT loop 14 is turned ON at the end of fine tuning, the VIF signal is accurately tuned and lock-in can be achieved quickly without degradation in video detection.

Figure 4A:
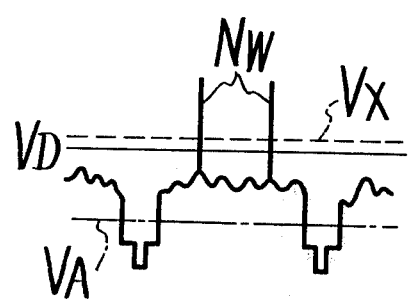
Figure 4B:
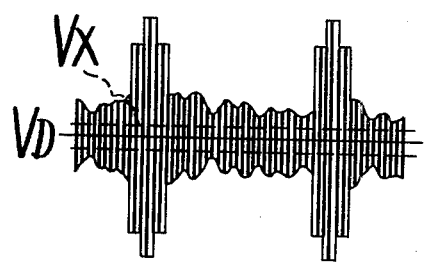

Lock-out detection may be performed in a number of different ways, each of which is within the scope of the present invention. Lock-out detector 30 may employ the difference in average levels of the output of synchronous video detector 4 to discriminate lock-in and lock-out. During lock-in, synchronous detector 4 delivers a detected video signal to lock-out detector 30 which has a predetermined polarity (shown as negative polarity in FIG. 4A) and an average luminous level VA substantially lower than a no-signal DC level VD. During lock-out, synchronous detector 4 delivers a detected signal (FIG. 4B) to lock-out detector 30 which includes beat components oscillating both positively and negatively about the no-signal DC level VD. The average level of the lock-out signal is thus approximately equal to the no-signal DC level VD as shown in FIG. 4B. Lock-out detector 30 may utilize this difference in average levels to discriminate lock-in and lock-out conditions.

Alternatively, lock-out detector 30 may use the presence or absence of white beat signals to discriminate lock-in and lock-out. As shown in FIG. 4A, during lock-in, the signal from synchronous detector 4 is more negative than the no-signal DC level VD, whereas during lock-out (FIG. 4B), the output signal from synchronous detector 4 is frequently more positive than the no-signal DC level VD. Noise spikes NW in the white, or positive, direction are called white beat. A white noise limiter or white noise canceller is usually provided to suppress any white noise NW during lock-in which exceeds a threshold VX established somewhat more positive than the no-signal DC level VD. Since white beat signals exceed threshold VX much more often during lock-out (FIG. 4B) than during lock-in (FIG. 4A), the output of a conventional white noise limiter can be used in lock-out detector 30.

Figure 5A:
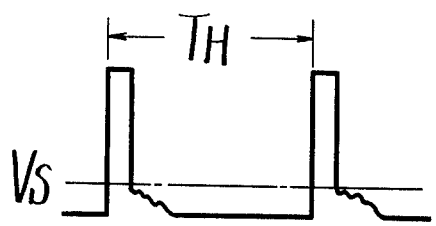
Figure 5B:
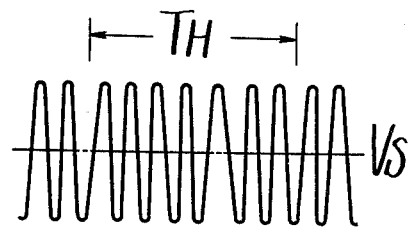

Lock-out detector 30 may alternatively use the ratio of average signal to peak-to-peak (P-P) signal to discriminate lock-in and lock-out conditions. The output signal from synchronous detector 4 is applied to a conventional synchronizing signal separating circuit (not shown) which may be included in lock-out detector 30. During lock-in, the separated synchronizing signal (FIG. 5A) is a regular waveform having an average level VS equal to about 1/10 of its P-P (peak-to-peak) value. During lock-out, no synchronizing signal is available to the synchronizing signal separating circuit. Its output therefore contains only noise and beat signals (FIG. 5B) having an average level VS about ½ of its P-P value. Reference letters $T_H$ in FIGS. 5A and 5B represent one horizontal period.

Alternatively, lock-out detector 30 can utilize the difference between the average levels of the output of the synchronizing signal separating circuit to discriminate lock-in and lock-out conditions without employing the ratios of average to P-P.

Referring now to the detailed diagram in FIG. 6, a pair of balanced output signals from phase detector 8 are fed through DC amplifier 10 and low pass filter 13 to local oscillator of tuner 2 (not shown). DC amplifier 10 is formed of transistors 11 and 12 whose emitters are connected together to AFT defeat switch 16 which is formed of a transistor 37. The output signals from phase detector 8 are also applied through DC amplifier 18 and low pass filter 20 to the reference oscillator 5. A capacitor 21, resistors 22, 23 and 24 and a diode 25 form low pass filter 20. Resistors 23 and 24 and diode 25 are connected in series between a positive power supply terminal $+V_{cc}$ and ground. Resistor 22 is connected between capacitor 21 and the junction of resistor 23 and diode 25. The junction of resistors 23 and 24 is connected to the collector of a transistor 36 in lock-out detector 30. When transistor 36 is in the cut-off, or non-conducting, condition, diode 25 is forward biased by the positive voltage fed to it through resistors 23 and 24. Since diode 25 is forward biased, it grounds one terminal of resistor 22. Thus, the time constant of low pass filter 20 is determined only by the capacitance of capacitor 21 and the resistance of resistor 22. When transistor 36 is in the saturated, or conducting, condition, it provides a low impedance path to ground from the junction of resistors 23 and 24 through its collector-emitter path. This removes the forward-biasing voltage from diode 25 and places the series combination of resistors 22 and 23 in series with capacitor 21. Thus, the time constant of low pass filter 20 is determined by the capacitance of capacitor 21 and the sum of resistances of resistors 22 and 23. As will be clear to one skilled in the art, the time constant of low pass filter 20 is longer under the latter condition than under the former condition.

The detected output signal from synchronous detector 4 is integrated in an RC integrating circuit 31 to produce a voltage equal to its average. The average voltage is fed to the base of a transistor 32 in lock-out detector 30. The collector voltage of transistor 32 is applied to the base of a transistor 33. Transistor 33 receives a reference voltage at its emitter equal to the no signal DC level VC (FIG. 4) which is produced at the junction of voltage divider resistors 34 and 35. The collector voltage of transistor 33 is applied to the base of a transistor 36 which has its collector connected to the connection point between the resistors 23 and 24. Defeat switch 17 may be a mechanical switch ganged with AFT defeat switch 16 but is preferably a transistor 38 having its emitter connected to the junction of voltage divider resistors 34 and 35. Defeat switches 16 and 17 are controlled by a mechanical AFT defeat switch 19. When mechanical AFT defeat switch 19 is OFF, or open, AFT defeat switch 16 is OFF, the AFT loop 14 is ON as set forth above. Defeat switch 17 is also OFF and hence the emitter of transistor 33 in lock-out detector 30 is supplied with the reference voltage corresponding to the level VD as set forth above.

When lock-out occurs, the integrated voltage from integrating circuit 31 increases. This turns transistor 32 ON which results in the base voltage of transistors 33 becoming low and thus turning transistor 33 ON. Transistor 36 is turned ON by the positive voltage fed to its base through the emitter-collector path of transistor 33. Capacitor 21 is thus grounded through resistors 22, 23 and transistor 36 and the time constant of the low pass filter 20 becomes relatively long as described above. When lock-in occurs, the integrated voltage from integrating circuit 31 decreases and the base voltage of transistor 33 increases, thus turning OFF transistors 33 and 36. As a result, diode 25 is forward biased, and capacitor 21 is grounded through resistor 22 and diode 25. Thus, the time constant of the low pass filter 20 becomes relatively short.

When mechanical AFT defeat switch 19 is turned ON, AFT defeat switch 16 is turned ON to turn AFT loop 14 OFF. Defeat switch 17 is also ON with the result that the emitter of transistor 33 in lock-out detector 30 is shunted to ground. Transistors 33 and 36 are turned OFF so that the time constant of low pass filter 20 is fixed at its smaller value.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. A television receiver for receiving a television signal comprising:

means including a local oscillator for tuning said television signal and for producing a video intermediate frequency signal;

a video intermediate frequency amplifier for amplifying said video intermediate frequency signal;

reference means having an oscillating frequency for producing a reference signal;

detector means for synchronously detecting said video intermediate frequency signal with said reference signal to produce a video signal;

means for detecting a phase difference between said video intermediate frequency signal and said reference signal and for producing a control voltage;

a first low pass filter for applying said control voltage to said local oscillator;

a switch for preventing application of said control voltage to said local oscillator;

a phase locked loop containing a second low pass filter, said second low pass filter having first and second time constants for applying said control voltage to said reference means for controlling the oscillating frequency of said reference means;

means responsive to said video signal to detect a lock-out condition in said detector means; and means in said second low pass filter, responsive to detection of a lock-out condition for changing from said first time constant to said second time constant.

2. A television receiver according to claim 1, further comprising a second switch operative to change the time constant of said second low pass filter to the longer of said first and second time constants thereof.

3. A television receiver for receiving a television signal and for producing at least a video signal therefrom, comprising:

first means including a local oscillator for automatically fine tuning said television signal and for producing therefrom a video intermediate frequency signal;

means including a reference oscillator and a low pass filter for producing a reference frequency signal;

said low pass filter having first and second different selectable time constants;

detecting means responsive to said video intermediate frequency signal and said reference frequency signal for detecting said video signal, wherein said detected video signal is supplied to said first means;

means responsive to an output of said detecting means for selecting one of said first and second selectable time constants; and means for preventing said detected video signal from being supplied to said first means.

4. A television receiver according to claim 3; further comprising other means for preventing production of said reference frequency signal and for selecting the longer of said first and second selectable time constants.

5. A television receiver according to claim 4; wherein said means for preventing operation of said first means is a first switch and said other means is a second switch ganged with said first switch.

6. A television receiver according to claim 3; wherein said low pass filter includes a capacitor to which a signal in said means for producing the reference frequency signal is applied, first, second and third resistors connected in series from said capacitor to a positive supply source, a diode connected from a junction of said first and second resistors to ground, and said means for selecting one of said time constants includes means for connecting a junction of said second and third resistors to ground in response to an output of said detecting means.

7. A television receiver according to claim 6; further comprising means operative for back biasing said diode and for connecting said junction of said second and third resistors to ground.

8. A television receiver according to claim 7; wherein said means for preventing operation of said first means includes a first switch, the last mentioned means includes a second switch ganged with said first switch, and said means for connecting a junction of the resistors to ground includes a transistor controlled by said second switch having a collector-emitter path in series from said junction of said second and third resistors to ground.

* * * * *